July 4, 1944.        J. J. TOMALIS        2,352,982
SCREW FOR PLASTICS
Filed June 25, 1942
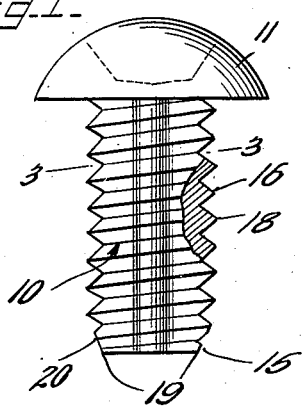
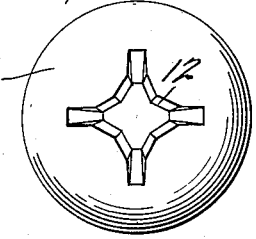
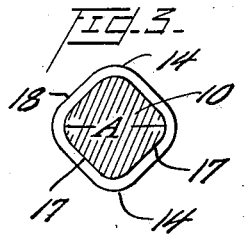
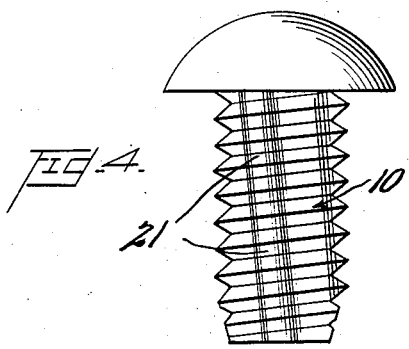
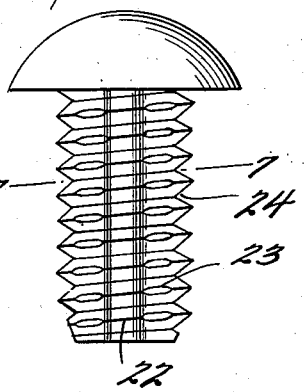
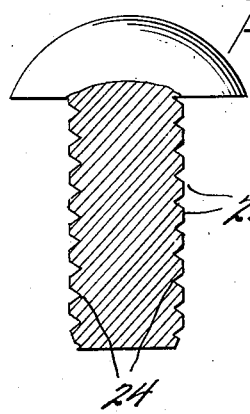
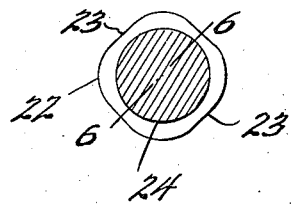
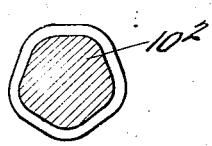
Inventor
Joseph J. Tomalis
By Watson, Cole, Grindle & Watson
Attorney Patented July 4, 1944

2,352,982

UNITED STATES PATENT OFFICE 2,352,982

SCREW FOR PLASTICS

Joseph John Tomalis, Providence, R. I., assignor to American Screw Company, Providence, R. I., a corporation of Rhode Island Application June 25, 1942, Serial No. 448,447

10 Claims. (Cl. 85—41)

This invention relates to screws, and more particularly to screws of the self-tapping or thread forming type intended primarily for use in synthetic plastics and materials of like physical characteristics.

It is a general object of the present invention to provide a novel and improved screw for use in plastics and like materials.

More particularly it is an object of the invention to provide a hardened metal screw provided with novel means for forming a thread in plastic material as it is introduced into a suitable pilot hole.

An important object of the invention resides in the provision of a screw in which the blank body, prior to threading, is of a circular configuration and in which the surface defined by the tops of the threads of the finished screw is of a non-circular configuration, the thread being in the form of a continuous helix of a plurality of turns extending from the tip of the shank toward the head of the screw.

A further important object of the invention consists in the provision of a screw formed with a shank of polygonal cross-section threaded for a substantial portion of its length with a thread of standard cross-section, of uniform depth and continuity throughout a plurality of continuous helical turns.

An important feature of the invention resides in the provision of a rolled thread of uniform depth and continuity throughout several continuous turns on the surface of a polygonal shank whereby self-tapping is provided when used in a pilot hole of proper diameter in a plastic material.

Another important feature of the invention resides in the provision of a screw for use in unthreaded holes in plastic material which requires less torque for driving than is required with the more or less conventional types of self-tapping screws which have one or more cutting edges for providing a mating thread on the walls of the pilot hole.

In another embodiment of the invention it is an important feature to provide a thread on a polygonal shank in which the root of the thread defines a cylindrical surface, whereas the tip of the thread follows the polygonal configuration of the exterior of the shank.

Other and further features and objects of the invention will be more apparent to those skilled in the art upon a consideration of the accompanying drawing and following specification wherein are disclosed several exemplary embodiments of the invention with the understanding that such modifications therein and combinations thereof may be made as fall within the scope of the appended claims without departing from the spirit of the invention.

In said drawing:

Figure 1 is a side elevation of a preferred embodiment of the invention shown partially broken away to illustrate the thread section;

Figure 2 is a top plan view of the same;

Figure 3 is a section taken on line 3—3 of Figure 1;

Figure 4 is a view similar to Figure 1 of an embodiment in which the flat sides of the polygonally sectioned shank follow a helical path from head to point of the threaded screw giving it the appearance of being twisted;

Figure 5 is a view similar to Figure 1 of an embodiment in which the thread roots are circular;

Figure 6 is a longitudinal central section through the same taken on line 6—6 of Figure 7;

Figure 7 is a transverse section taken on line 7—7 of Figure 5; and

Figure 8 is a transverse section of a further embodiment.

In a great number of industries there has been an insistent and constant demand for improved forms of screws for use in the various types of plastics which are now becoming so popular for use in almost every field. While there is a substantial use of laminated sheets, most of these plastics are molded to shape and in many cases can be provided with pilot holes molded during the original molding operation to receive screws for fastening parts thereto. In other cases, pilot holes must be drilled after the piece is formed. It is extremely difficult to mold threads in these holes and tapping in a subsequent operation with conventional forms of taps has always added substantially to the cost of manufacturing.

Various forms of self-tapping screws have been offered and tried, but these have suffered from numerous disadvantages such as high cost, difficulty of handling and starting, splitting of the material, failure to make a proper thread that will hold satisfactorily, and others. In an effort to overcome these difficulties and to provide a satisfactory self-tapping screw which has the added advantage of resisting withdrawal, particularly when used in certain types of plastics, with much more tenacity than have types heretofore known, the present type has been devised.

All previous self-tapping screws have been based on the principle of cutting mating threads in the material surrounding the pilot hole by one or more abrupt edges formed by fluting or otherwise interrupting the threads on the shank of the screw, particularly near the tip, to provide some recognized form of tap cutting edge. The present screw departs from that practice and relies on an operation more nearly analogous to that of rolling threads on screws and the like, to form the threads in the pilot hole. The operation is accomplished substantially without the formation of chips so that no clearance spaces have to be cut into the shank of the screw to accommodate chips. The screw shank is thus not weakened and liable to breakage.

The novel results are preferably attained by forming a thread on a cylindrical screw blank body so as to produce a finished product of regular polygonal cross-section and of not too many sides. This thread, in the preferred embodiment, is of uniform depth and complete in every respect throughout the whole of its length which should consist of a plurality of helical turns. Naturally when such a screw is inserted in a circular pilot hole only the portions of the thread on and adjacent the corners or edges of the shank engage with the walls of the pilot hole. These are thus enabled better to form a thread in the plastic because of the lessened circumferential bearing surface which decreases the friction. Less driving torque is required. The shape of the screw provides certain clearance spaces along the flats of the shank for any material which may be cut, chipped or pressed out of place. In certain types of plastics which are resilient, in the nature of less hard Celluloids and the like, the non-circular thread as it is advanced tends to cause a certain flow of the material, and when the screw is in final position there is a return of the stretched material toward the opening which causes it to close in about the non-circular shank and its thread and securely lock the screw in position, ensuring against its accidental removal from vibration or the like.

Referring now to the drawing for a more complete understanding of the invention, reference should be had first to Figures 1, 2 and 3 wherein is illustrated the preferred embodiment of the invention shown as applied to a screw of more or less conventional type in that it contains a shank 10 of any desired and necessary diameter and length and a head 11, shown as of the so-called round type and, as illustrated in Figure 2, equipped with the "Phillips" recess 12 for receiving a screw driver for driving the same. While it is obvious that heads of any desired and known shape may be applied to the screw and that any form of kerf or recess for engagement by a screw driver, or exterior configuration for the application of a wrench may be provided, it is found that the Phillips recess is the most desirable since it enables the better application of the additional torque necessary for driving the screw in an unthreaded pilot opening and for ensuring against wobbling or crooked driving. This results from the better fit between the driver and screw recess ensuring alignment of the screw shank with the axis of the driver.

The shank of the finished screw, as shown in Figure 3, is substantially square in cross-section, although any regular polygonal form or in fact any non-circular form is satisfactory. It is preferred, however, not to have too many sides so that the shank does not approach too closely to circular configuration. The shank is uniform in cross-section throughout the major portion of its length and is slightly rounded on the corners in the finished form as shown at 14, so that no sharp edges are provided. The free end of the shank is tapered as shown at 15, about which more will be mentioned later.

In the preferred form, the thread 16 is applied by rolling so that it is a complete, continuous, helix for its entire prolongation which may extend to substantially the length of the shank as shown, if desired. Obviously the thread may be optionally formed as by any desired system, but the rolling method seems simpler and preferable, the rolling being accomplished by dies whose surfaces are not plane but may be considered as scalloped and grooved for uniform depth along the scallops. Each scallop will have a chordal length along the die equivalent to one face of the finished screw shank.

The result of producing the thread of the type described, that is, of non-circular configuration, causes the root 17 of the thread to form in cross-section the same outline as the crest 18 thereof because, as previously stated, the depth of the thread from the root to the crest is uniform throughout its full length. Preferably the thread is of the conventional 60° V-type and is given the same lead and helix as a conventional machine screw formed on a cylindrical shank. It is preferred that the screw be case hardened, carburized or otherwise prepared to provide relatively hard thread surfaces for cutting into plastics, soft die castings and the like. The screw may also be used for sheet metal where the requirement for hardness of the thread is well recognized.

The pilot hole for receiving the screw should preferably have a diameter not much less than the maximum dimension across the roots of the threads such as that dimension indicated at A in Figure 3 so that reaming action by the screw is not required for introducing the same. The only action is that of threading by the portion of the threads outside of a circle of diameter A. All that portion of the thread lying outside of this circle will engage the material into which the screw is introduced and serve to provide the desired holding power for the articles attached to the plastic material by means of the screw. It will be obvious that there will be portions of the pilot hole (adjacent the flats of the shank) which will not be entirely filled with the threaded portion of the screw shank and into these spaces any extraneous material forced, cut or chipped from the plastic will be received so that these spaces can be considered as of the nature of the clearance spaces provided by the flutes of taps. It will be understood, however, that this screw does not in the usual sense tap a hole by cutting since there are no cutting edges. It squeezes or flows the material away to provide entrance room.

In order that the screw may be readily introduced it has been previously mentioned that the starting end is tapered or reduced in cross-sectional area preferably by continuing its non-circular configuration, although, if more convenient, the tapered portion may be truly conical. The maximum diameter across the points 19 should be less than the dimension A or the diameter of the pilot hole for ease in starting. No particular effort is made to thread the starting portion to full depth along its conical surface. The regular thread being formed on the main portion of the shank is carried out on the taper to only the same root depth as on any other portion of the shank so that the tips of the threads are blunted as seen at 20 in increasing width toward the starting end.

The form of the invention illustrated in Figure 4 is identical with that of Figures 1, 2 and 3 except that in the thread rolling the shank 10' is given a slight twist or lead 21 in a direction opposite to that of the threads, although the direction of this twist is not restricted to that shown. The amount of twist is relatively small and may consist of one turn in about 50 threads, although this ratio is not critical. Such a twist ensures that the salient points or crests of the thread are not all cutting in the same line parallel to the axis of the screw at the same time and may serve to reduce the possibility of chipping at the surface because of the resulting increase in the length of the path to which the same amount of wedging action is applied by the burying threads.

In Figures 5, 6 and 7 is shown an embodiment in which the exterior configuration of the shank is the same as in the preferred embodiment but in which the thread is formed by a normal cutting operation involving the rotation of a non-circular blank about its axis against cutting dies or thread chasers. This results in the peculiar thread arrangement seen in the drawing in which on the rounded corners or edges 22 the threads are of full depth and sharp on the crests as clearly seen, whereas on the flats the thread crests are also flattened as at 23, each having elongated elliptical surfaces as seen in Figure 5.

Because of the method of cutting the thread in this embodiment the the root 24 follows along the surface of a cylinder of a diameter equal to the difference between the maximum dimension of the shank less twice the thread depth. Obviously the depth of the threads is only a maximum at the corners and is a minimum in the center of the flats as clearly seen in Figure 7. The section in Figure 6 shows the flats 23 where they are of maximum width. It will be clear that in every place the root is a sharp V, but the crest varies from a sharp V to a broad flat at every change from a corner to a flat surface on the shank. The important or burying portions of the thread at the corners where the cutting action is effected are of the same configuration as in the preferred embodiment so that the self-tapping action is not at all interfered with. The same sort of starting end for introducing the screw into the pilot opening is provided on this embodiment as on the preferred embodiment and that of Figure 4.

In Figure 8 is shown a cross-section of an embodiment similar to that of Figure 1 but having five sides to the shank 10² instead of four. Obviously sides of three to eight or more can be used and in addition the screw could be made in elliptical form so that there would only be two sets of burying or cutting edges, but this is not so desirable as a larger number of corners which tend to ensure straighter running of the screw into the pilot hole.

While sharp V threads have been shown as preferred, it is obvious that any of the conventional types of threads and others can be used. The starting end need not be truncated but can be carried out to a sharp tip if desired. The pitch, lead and helix of the screw may be changed to suit varying conditions and types of plastics with which it is to be used.

It will be clear that the preferred embodiment of the screw in which the threads are of uniform depth throughout their length can also be formed by initially providing a non-circular shank on which the threads are rolled without the necessity of simultaneously deforming the blank.

Having thus described the invention, what is claimed as new and desired to be secured by Letters Patent is:

1. A screw comprising a shank of uniform substantially polygonal cross-section with rounded corners throughout the major portion of its length, and a continuous V-thread extending from one end of the shank for a plurality of complete helical turns about the full periphery of the said shank.

2. A screw comprising a shank of uniform substantially polygonal cross-section with rounded corners throughout the major portion of its length, a continuous V-thread extending from one end of the shank for a plurality of complete helical turns about the full circumference of the said shank, and a tapered pilot end on said shank, said thread extending onto at least the larger portion of said pilot end.

3. A screw including a shank of uniform substantially polygonal cross-section with rounded corners throughout the major portion of its length, and a continuous V-thread of uniform depth extending from one end of the shank for a plurality of complete helical turns about the full circumference of the said shank.

4. A screw including a shank of uniform substantially polygonal cross-section and rounded edges throughout the major portion of its length, said shank being threaded from one end with a V-thread of standard lead and helix, and of uniform depth.

5. A screw including a shank of uniform substantially polygonal cross-section and rounded edges throughout the major portion of its length, said shank being threaded from one end with a continuous V-thread of standard lead and helix, the whole length of said thread being of uniform depth, a pilot end on said shank of tapered configuration and having a continuation of said thread thereon of decreasing depth.

6. A screw comprising a shank of substantially square cross-section with rounded corners throughout most of its length, a head integral with said shank, and a continuous thread of uniform depth and configuration extending from the end opposite the head for a plurality of continuous helical turns about the full perimeter of said shank.

7. A screw comprising a head and integral shank of uniform cross-section except for a tapered pilot end, said cross-section being square with all corners slightly rounded, a thread formed on said shank for a plurality of continuous helical turns, all parts of which are of uniform depth and configuration.

8. A screw comprising a head and integral shank of uniform cross-section except for a tapered pilot end, said cross-section being square with rounded corners, a thread formed on said shank for a plurality of continuous helical turns, all parts of which are of uniform depth and configuration, said thread extending onto said pilot end and disappearing thereon by gradual reduction in depth.

9. A screw comprising a head and an integral shank of uniform cross-section for the major portion of its length, said cross-section being generally polygonal with rounded corners, a thread formed on said shank for a plurality of continuous helical turns, the root of said thread conforming to the surface of a cylinder of less diameter than the maximum cylinder which can be inscribed in the shank, and the crests of the threads being sharp only at the edges of the shank.

10. A screw comprising a head and an integral shank of uniform cross-section for the major portion of its length, said cross-section being square with slightly rounded corners, a V-thread formed on said shank for a plurality of helical turns, the root of said thread conforming to the surface of an imaginary cylinder nowhere in contact with the walls of the shank.

JOSEPH JOHN TOMALIS.